United States Patent [19]

Yasui et al.

[11] Patent Number: 4,892,164
[45] Date of Patent: Jan. 9, 1990

[54] FRAME AND BODY CONSTRUCTION FOR SMALL SNOWMOBILE

[75] Inventors: Toshihiro Yasui; Masanori Sugita; Tsuneo Isobe, all of Iwata, Japan

[73] Assignee: Yamaha Hatsuodoki Kabushiki Kaisha, Iwata, Japan

[21] Appl. No.: 163,389

[22] Filed: Mar. 2, 1988

[30] Foreign Application Priority Data

Mar. 4, 1987 [JP] Japan .................................. 62-49058

[51] Int. Cl.4 .............................................. B60K 13/02
[52] U.S. Cl. ................................ 180/68.3; 123/195 C; 123/198 E; 180/190; 180/311
[58] Field of Search .............. 180/190, 191, 192, 68.3, 180/69.23, 215, 312, 311; 123/198 E, 195 C; 296/193, 196, 197, 203, 204, 35.1, 187, 190; 114/270; 440/76

[56] References Cited

U.S. PATENT DOCUMENTS

| | | | |
|---|---|---|---|
| 2,815,742 | 12/1957 | Kiekhaefer | 123/198 E |
| 3,036,566 | 5/1962 | Dobbertin | 123/198 E |
| 3,773,127 | 11/1973 | Aaen et al. | 180/190 |
| 3,821,994 | 7/1974 | Bergius et al. | 180/190 |
| 3,870,115 | 3/1975 | Hase | 180/190 |
| 3,871,460 | 3/1975 | Dehnert | 180/190 |
| 4,122,820 | 10/1978 | Ryberg | 123/198 E |
| 4,453,434 | 6/1984 | Lissy | 81/57.29 |
| 4,475,616 | 10/1984 | Yamazaki et al. | 180/68.3 |
| 4,648,650 | 3/1987 | Fujii et al. | 296/203 |

*Primary Examiner*—Charles A. Marmor
*Assistant Examiner*—Eric Culbreth
*Attorney, Agent, or Firm*—Ernest A. Beutler

[57] ABSTRACT

A frame and body construction for a small snowmobile comprised of a generally open tubular frame to which a light weight generally inverted cup shape body is detachably connected. To prevent carburetor icing, an insulating box encircles the carburetor and cooperates with the body, when the body is in place.

5 Claims, 4 Drawing Sheets

FRAME AND BODY CONSTRUCTION FOR SMALL SNOWMOBILE

BACKGROUND OF THE INVENTION

This invention relates to a frame and body construction for a small snowmobile and more particularly to a light weight frame and body construction that facilitates servicing and wherein certain running components of the engine are protected.

There is a need for a light weight highly maneuverable snowmobile that can accommodate primarily a single rider. Such a snowmobile should be highly maneuverable relatively robust in construction but should, at the same time, offer ease of servicing. Many conventional snowmobiles are formed with a combined body frame structure that is made up of a plurality of steel stampings that are welded together. Such arrangements obviously require substantial weight and the necessity of using several different stampings and welding them together adds to the cost of the overall assembly. Furthermore, such welded up constructions made it difficult to position the driving components of the snowmobile in such a way that the snowmobile can be conveniently serviced.

It is, therefore, a principal object of this invention to provide an improved light weight frame and body construction for a small snowmobile.

It is a further object of this invention to provide a body frame relationship for a small snowmobile wherein the body may be easily and quickly lifted off of the frame for servicing.

One way in which the body and frame can be united for such quick disassembly is to employ a body that has a generally inverted cup shape so that it can be placed on the frame by lowering it into place and then locking it there. With such an arrangement, the entire underside of the snowmobile will be generally exposed. This means that the engine is exposed to the elements over which the snowmobile is operating. Because of this exposure, there can be certain running difficulties. For example, the flow of cold air around the induction system of the engine can cause icing and other problems.

It is, therefore, a still further object of this invention to provide an improved light weight snowmobile construction wherein certain running components of the engine are protected but wherein disassembly of the body from the snowmobile is facilitated.

SUMMARY OF THE INVENTION

A first feature of this invention is adapted to be embodied in a small snowmobile having a welded up tubular frame. A body is provided having a generally inverted cup shape that is adapted to be lowered over the frame. Quick disconnect fastening means interact between the body and mounting points on the frame for affixing the body to the frame and for permitting its rapid removal.

Another feature of the invention is adapted to be embodied in a construction for a small snowmobile or the like that comprises a generally open frame assembly with an engine supported within the frame assembly and having an induction system including a charge forming device. A body is affixed to the frame assembly and overlies the engine. The body has a substantially open lower area for facilitating assembly onto the frame assembly and whereby the underside of the engine is substantially exposed. A charge forming device enclosure cooperates with the body for enclosing the charge forming device for insulation of the charge forming device from the elements.

DETAILED DESCRIPTION OF THE PREFERRED EMBODIMENT OF THE INVENTION

Figure 1:
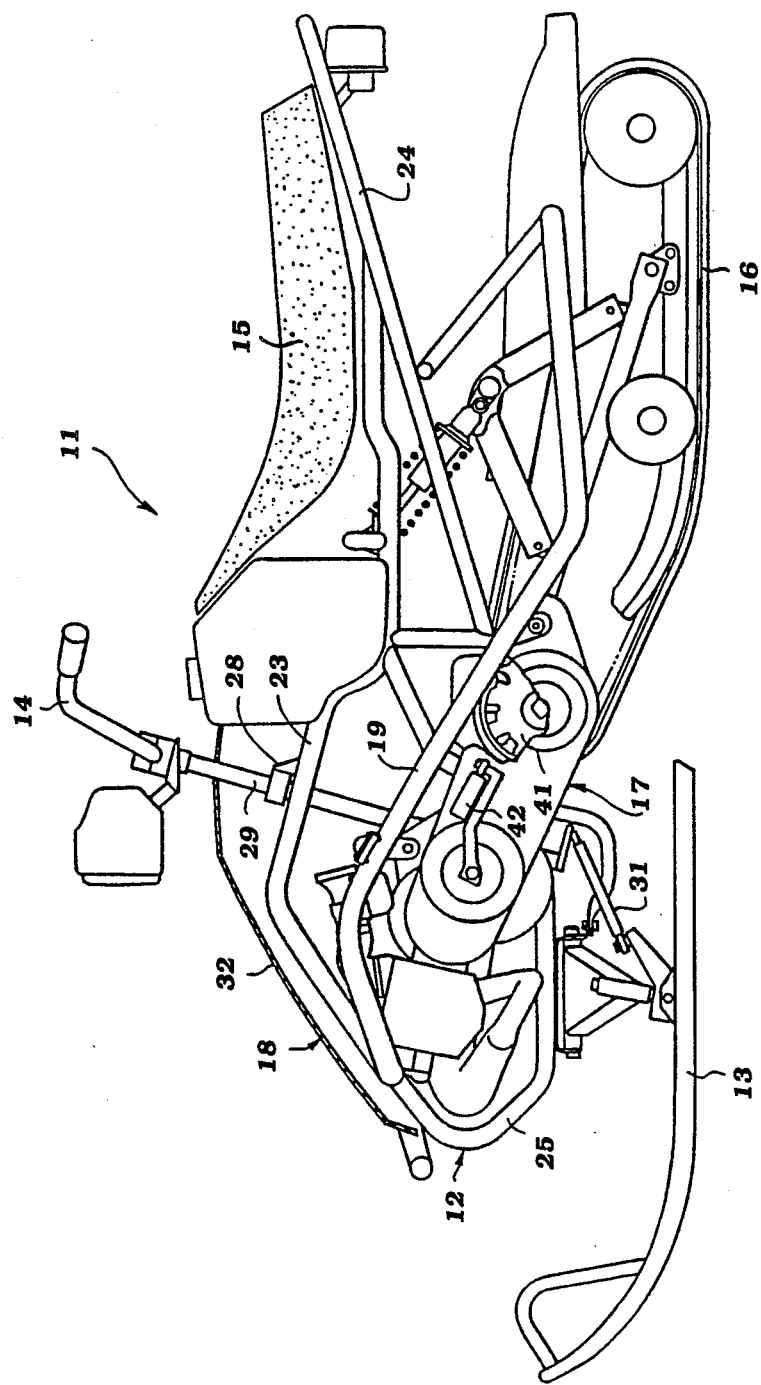
FIG. 1 is a side elevational view of a small snowmobile constructed in accordance with an embodiment of the invention, with a portion of the body broken away so as to more clearly show the construction.

Referring now in detail to the drawings and primarily initially to FIG. 1, a small snowmobile constructed in accordance with an embodiment of the invention is indicated generally by the reference numeral 11. The snowmobile 11 is comprised of a frame assembly 12 which is of the tubular welded up type and which dirigibly supports a pair of front skis 13 at its forward end. The skis 13 are steered by a handlebar assembly 14 that is positioned on the frame 12 forwardly of a seat 15. The snowmobile and specifically the seat 15 is configured so as to accommodate a single rider.

A drive belt 16 is positioned beneath the seat 15 and is driven by a power unit, indicated generally by the reference numeral 17. The power unit 17 is mounted within the frame 12 and drives the belt 16 in a manner as described in the copending application entitled "Engine Mounting and Drive Arrangement for Small Snowmobile," Serial No. 162,179, filed Feb. 29, 1988, in the name of Toshihiro Yasui et al. A body, indicated generally by the reference numeral 18 is supported upon the frame 12 and overlies the power unit 17.

Figure 2:
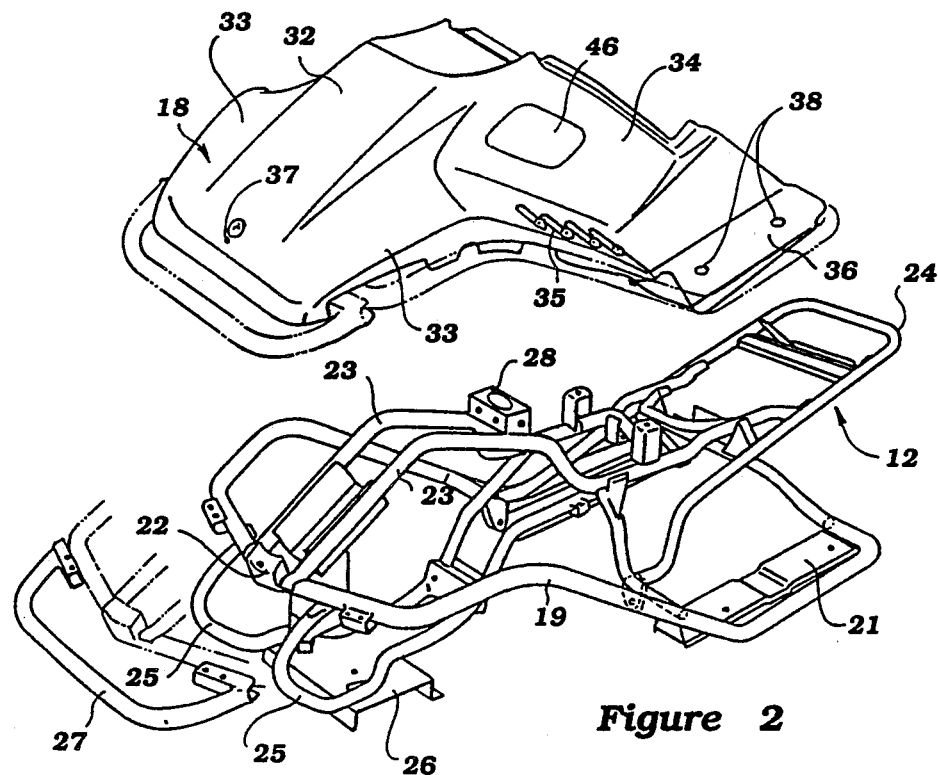
FIG. 2 is an exploded perspective view showing the frame and body assembly and indicating how the body is mounted onto the frame.

Referring now primarily to FIG. 2, the frame 12, as has been previously noted, is of the welded up tubular type. The frame 12 is comprised of a first formed frame member 19 that forms generally an outer perimeter of the frame 12. The frame member 19 may be formed from one or a plurality of tubes and carries mounting pads 21 at outwardly extending sides that are adapted to accommodate the feet of a rider seated on the seat 15. In addition, a forwardly positioned mounting pad 22 is provided at the forward end of the frame member 19.

The frame further includes a pair of inner tubular frame members 23 which extend inwardly of the perimeter member 19 from its front end to a rear seat rail portion 24. The seat rail portion 24 is comprised of a separate tube or tubes. In addition, a pair of down tubes 25 are connected to the forward ends of the perimeter frame member 19 and extend rearwardly and are connected at their rear ends to the inner frame members 23. The down tubes 25 carry an inverted channel shape member 26 that supports the front suspension system for the skis 13 in a manner as described in copending application entitled "Frame Construction for Small Snowmobile," Ser. No. 162,733, filed Mar. 1, 1988 in the name of Toshihiro Yusui et al and assigned to the assignee of this application.

A separate grab bar 27 is affixed by bolting to the forward end of the perimeter frame member 19. As may be readily seen from FIG. 2, the frame 12 includes a number of other reinforcing members than those described. However, the actual configuration of the frame 12 itself may be varied to suit desired applications and, for that reason, further details are believed to be unnecessary.

A box like reinforcing structure 28 is connected to the inner frame members 23 forwardly of the seat 15. This box like member 28 journals a steering shaft 29 to which the handlebar assembly 14 is connected. The lower end of the steering shaft 29 is connected to the skis 13 by means of tie rods 31 for the steering of the skis.

Figure 3:
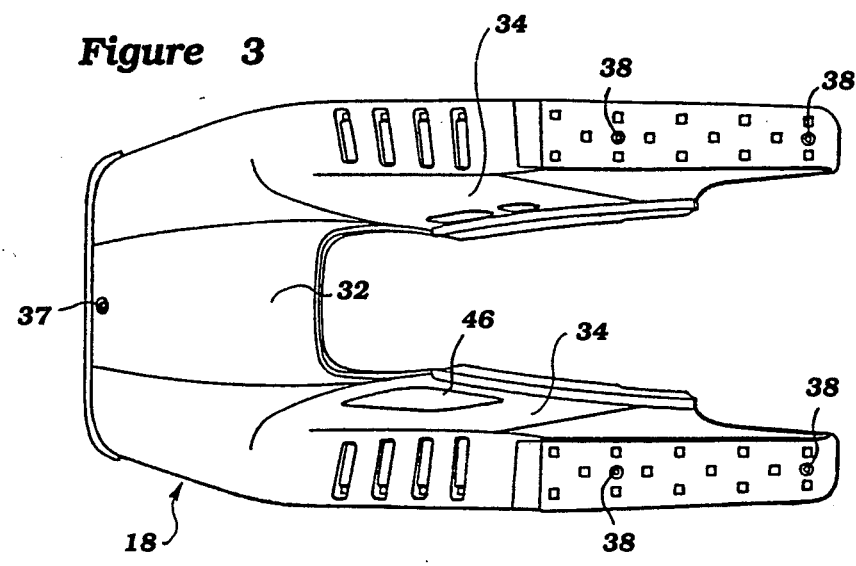
FIG. 3 is a top plan view of the body.
Figure 4:
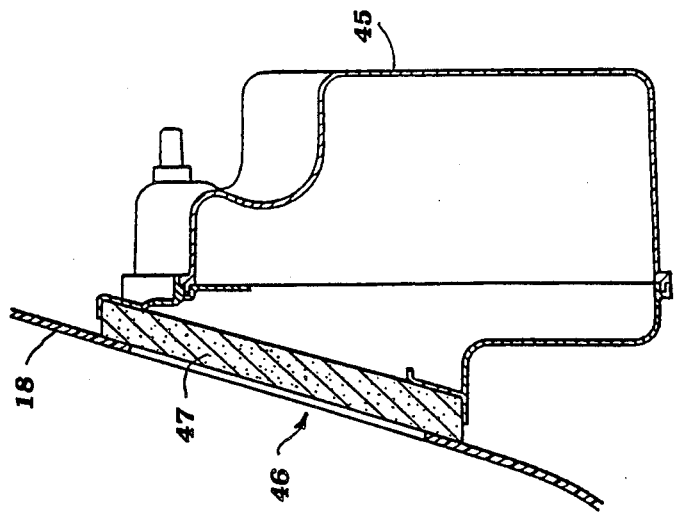
FIG. 4 is a cross-sectional view showing the construction of the air inlet formed between the body and the engine induction system.
Figure 5:
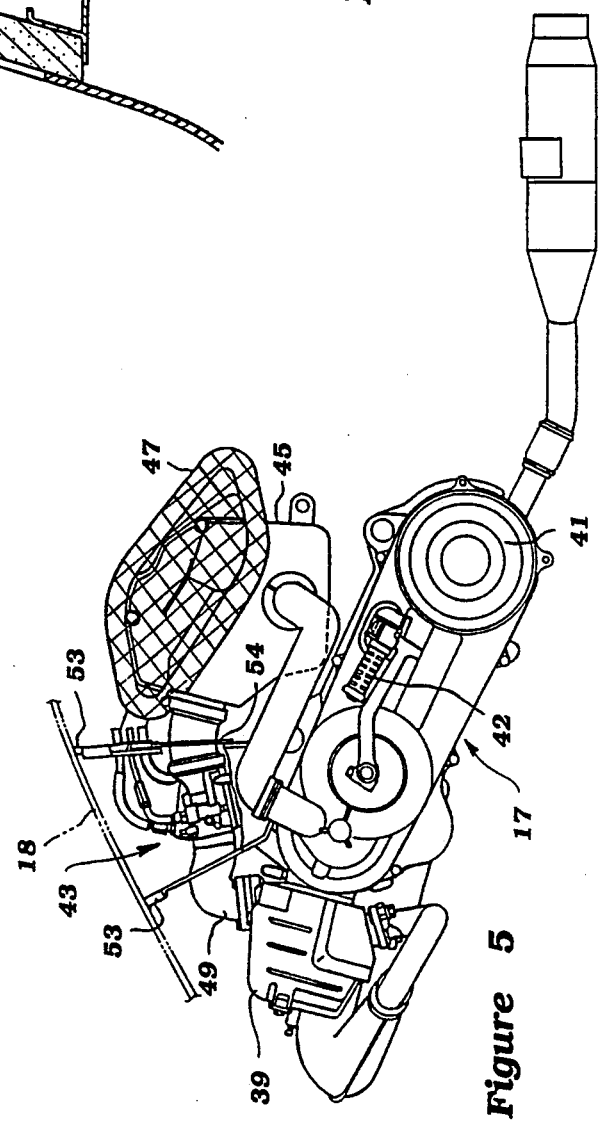
FIG. 5 is a side elevational view showing the construction of the power unit for the snowmobile.
Figure 6:
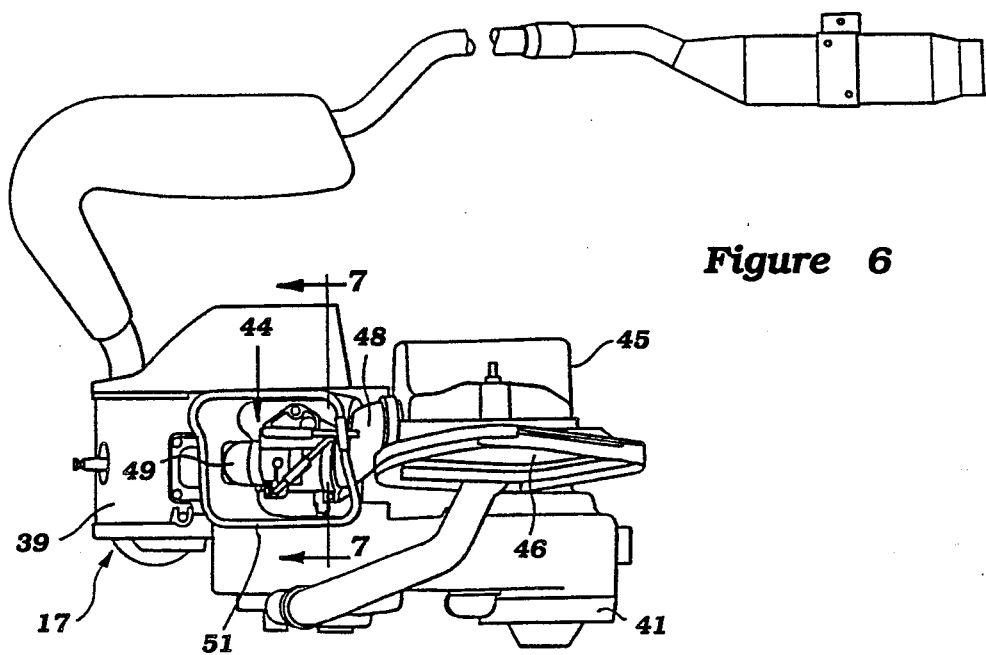
FIG. 6 is a top plan view of the components shown in FIG. 5.

Referring now still additionally to FIG. 3, the body 18 is formed of moulded fiberglass and, as has been previously noted, has a generally inverted cup shape. The body 18 is provided with a central cowl portion 32 that is defined between a pair of fender like portions 33. The portions 33 extend first upwardly and then taper downwardly on oppositely facing sides 34 of the cowl portion. The downwardly extending parts are formed with ridges 35 for stiffening and to accommodate the rider's feet if he so desires. In addition, the side portions 33 end in horizontally extending portions 36 that overlie the attaching plates 21.

It should be noted that the front of the cowl portion 32 is formed with an opening 37 while the foot portions 38 are formed with openings 38. These respective openings 37 and 38 are adapted to pass quick disconnect fasteners which cooperate with corresponding parts on the mounting pads 22 and 21, respectively, for readily detaching the body 18 to the frame assembly 12. It should be noted that this attachment and disconnection can be easily accomplished by merely lifting the body 18 vertically upwardly relative to the frame assembly for ease of insertion and removal for servicing of the running components position beneath the body 18 and which will now be described.

Referring now primarily to FIGS. 4 through 8, the power unit 17 includes a single cylinder internal combustion engine 39 that has an output shaft which drives a variable speed pulley type transmission 41. The transmission 41, in turn, drives the drive belt 16 in a suitable manner, for example the manner described in aforenoted copending application Ser. No. 162,179. In addition, the engine 39 is provided with a kick starter 42 for ease of starting. Because of the open configuration of the body as seen in FIG. 1, the kick starter 42 is readily accessible to the rider.

The engine 39 is provided with an induction system, indicated generally by the reference numeral 43. The induction system 43 includes a carburetor 44 that draws filtered air from a rearwardly positioned air box 45. The air box 45 is positioned adjacent to a portion of the cowling part 32 of the body 18 and specifically one of the side faces 34. This one side face 34 is provided with an air inlet opening 46 and a body of filter material 47 is positioned across the opening 46 so as to filter the air which enters the air box 45. A conduit 48 conveys air forwardly from the air box 45 to the inlet of the carburetor 44. The air fuel mixture from the carburetor 44 is delivered to the engine 39 through an intake manifold 49.

Figure 7:
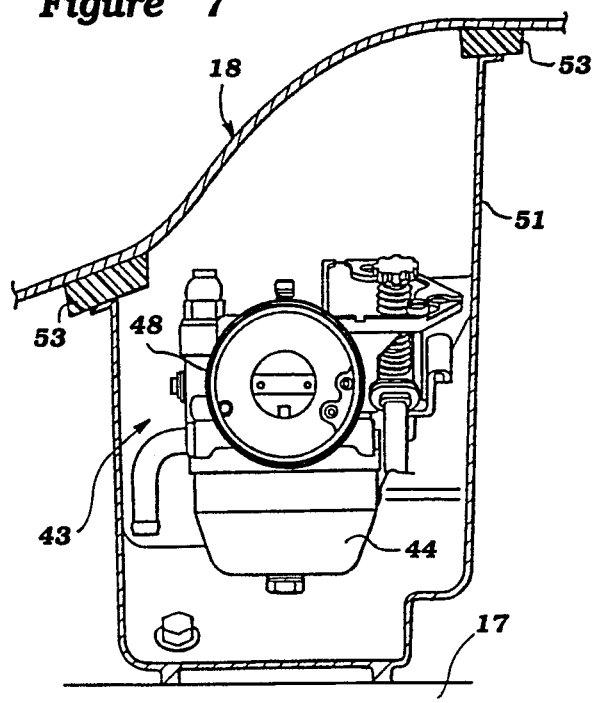
FIG. 7 is an enlarged cross-sectional view taken generally along the line 7—7 of FIG. 6.
Figure 8:
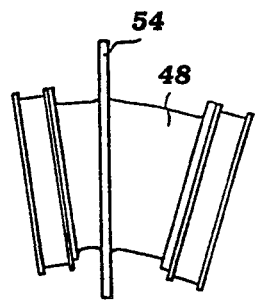
FIG. 8 is a view showing the interrelationship between the rear wall of the carburetor enclosure and the conduit for passing air through it.

Because of the fact that the body 18 is generally open at its lower face, this means that the engine 39 and its carburetor 44 will be generally exposed. The cold air associated with the terrain over which snowmobiles are ridden can very likely cause icing conditions because of such exposures. In order to prevent these icing conditions, an upwardly extending box like member 51 is affixed to the power unit 17 by means of fasteners 52 (FIG. 7). The box like member 51 is open at its upper end and carries a sealing gasket 53 that will be engaged by the body 18 when in place so as to fully enclose the carburetor 44 and effectively insulate it. As a result, icing is not a problem. It should be noted that the rear wall 54 of the box like member 51 is formed integrally with the air conduit 48 so as to further simplify the construction.

From the foregoing description it should be readily apparent that an extremely effective body frame construction is provided for a small snowmobile and wherein the body can be easily removed. Even though the body has a generally opened configuration, induction sytem icing is precluded by the formation of an insulating box around the induction system. The foregoing description is, of course, only that of a preferred embodiment of the invention and various changes and modifications may be made without departing from the spirit and scope of the invention, as defined by the appended claims.

We claim:

1. A small snowmobile or the like comprising a generally open welded, tubular frame assembly, an engine supported in said frame assembly and having an induction system including a charge forming device, a body having a generally inverted cup shape affixed to said frame assembly and overlying said engine, said body having a substantially open lower area facing said frame assembly and said engine for facilitating assembly onto said frame assembly and whereby the underside of said engine is substantially exposed to the elements when said body is affixed to said frame assembly, and a charge forming device enclosure fixed to said engine and cooperating with said body for enclosing said charge forming device for insulation of said charge forming device from the elements.

2. A small snowmobile or the like as set forth in claim 1 wherein the charge forming device enclosure comprises a generally upwardly opening box encircling the charge forming device.

3. A small snowmobile or the like as set forth in claim 2 further including sealing means carried by the upper end of the box and adapted to sealingly engage the body.

4. A small snowmobile as set forth in claim 1 wherein the frame is provided with a pair of outwardly extending horizontally disposed side portions, the body having horizontally extending foot rests at opposite sides therein, said body being lowered onto and detachably affixed to said frame by quick disconnect fastening means passing through said foot rests and affixed to said frame side portions.

5. A small snowmobile as set forth in claim 4 further including a seat carried by the frame rearwardly of the body and adjacent to the horizontally extending side portions thereof.

* * * * *